DESIGN.
C. J. PULT.
DISPLAY RACK.
Reissued Jan. 4, 1921. 15,021.
APPLICATION FILED NOV. 4, 1920.
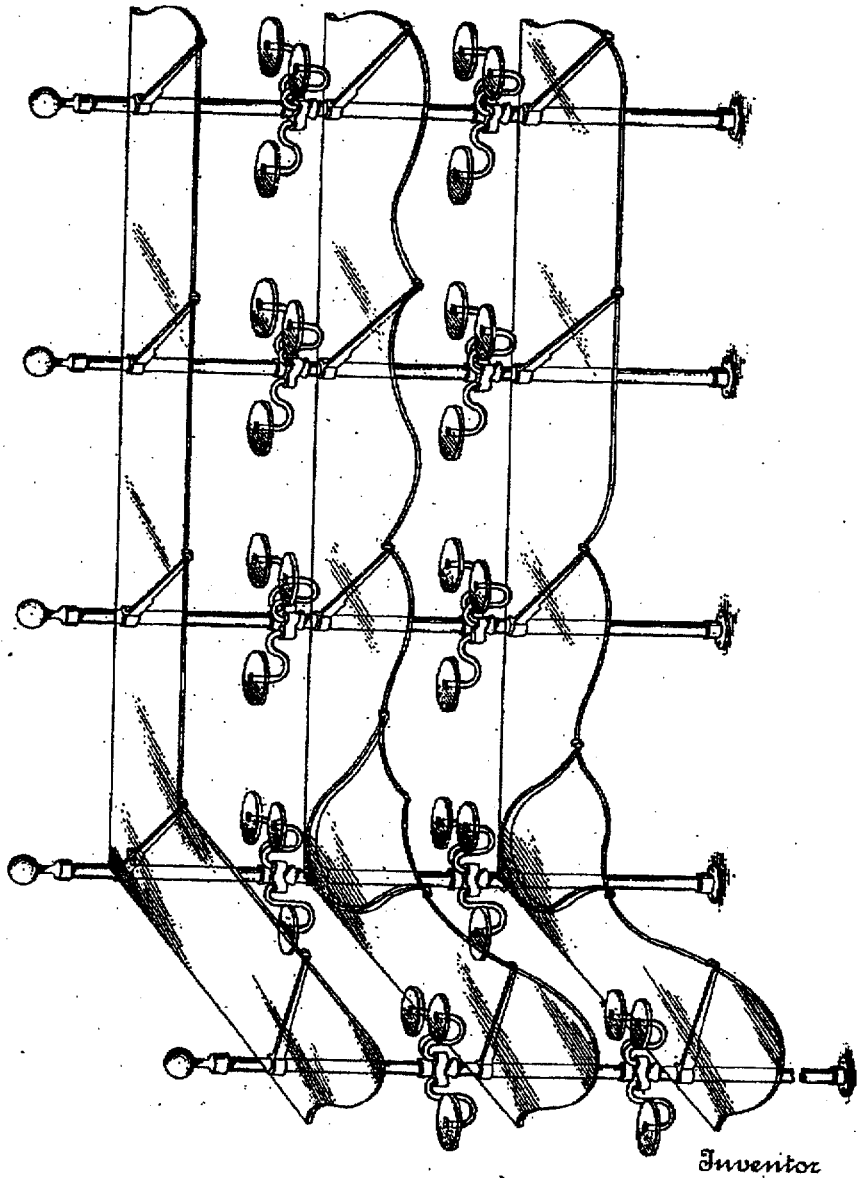
Inventor
Casper J. Pult
By [signature]
Attorney

UNITED STATES PATENT OFFICE.

CASPER J. PULT, OF DETROIT, MICHIGAN.

DESIGN FOR A DISPLAY-RACK.

15,021. Specification for Reissued Design. Reissued Jan. 4, 1921.

Original No. 54,769, dated March 23, 1920, Serial No. 324,712, filed September 18, 1919, for 3½ years. Application for reissue filed November 4, 1920. Serial No. 421,720½. Term of patent 14 years.

*To all whom it may concern:*

Be it known that I, CASPER J. PULT, a citizen of the United States, residing at Detroit, in the county of Wayne and State of Michigan, have invented a new, original, and ornamental Design for a Display-Stand, of which the following is a specification, reference being had to the accompanying drawing, forming part thereof.

The figure is a perspective view of a display stand, showing my new design.

I claim:

The ornamental design for a display stand, as shown.

CASPER J. PULT.

Witnesses:
ANNA M. DORR,
KARL H. BUTLER.